US011080603B2

United States Patent
Odena

(10) Patent No.: US 11,080,603 B2
(45) Date of Patent: Aug. 3, 2021

(54) SYSTEMS AND METHODS FOR DEBUGGING NEURAL NETWORKS WITH COVERAGE GUIDED FUZZING

(71) Applicant: Google LLC, Mountain View, CA (US)

(72) Inventor: Augustus Quadrozzi Odena, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/415,693

(22) Filed: May 17, 2019

(65) Prior Publication Data

US 2019/0354870 A1 Nov. 21, 2019

Related U.S. Application Data

(60) Provisional application No. 62/673,751, filed on May 18, 2018.

(51) Int. Cl.
*G06N 3/10* (2006.01)
*G06F 11/36* (2006.01)
*G06N 3/08* (2006.01)

(52) U.S. Cl.
CPC ............ *G06N 3/10* (2013.01); *G06F 11/366* (2013.01); *G06N 3/08* (2013.01)

(58) Field of Classification Search
CPC ........... G06N 3/10; G06N 3/08; G06F 11/366
See application file for complete search history.

(56) References Cited

U.S. PATENT DOCUMENTS

| | | | | |
|---|---|---|---|---|
| 8,464,219 B1* | 6/2013 | Wilkerson | ......... | G06F 11/3664 717/120 |
| 2009/0172664 A1* | 7/2009 | Mostafa | ............. | G06F 11/3089 718/1 |
| 2012/0130702 A1* | 5/2012 | Citron | ................ | G06F 11/3672 703/22 |
| 2017/0286845 A1* | 10/2017 | Gifford | ................. | G06Q 30/02 |
| 2018/0143896 A1* | 5/2018 | Ivancic | ................ | G06N 3/0445 |

(Continued)

OTHER PUBLICATIONS

Persaud, Navindra. "Humans can consciously generate random number sequences: A possible test for artificial intelligence." Medical hypotheses 65.2 (2005): 211-214. (Year: 2005).*

(Continued)

*Primary Examiner* — Li B. Zhen
*Assistant Examiner* — Markus A Vasquez
(74) *Attorney, Agent, or Firm* — Dority & Manning, P.A.

(57) ABSTRACT

The present disclosure provides systems and methods for debugging neural networks. In one example, a computer-implemented method is provided, which includes obtaining, by one or more computing devices, one or more inputs from an input corpus. The method further includes mutating, by the one or more computing devices, the one or more inputs and providing the one or more mutated inputs to a neural network; obtaining, by the one or more computing devices as a result of the neural network processing the one or more mutated inputs, a set of coverage arrays; determining, by the one or more computing devices based at least in part on the set of coverage arrays, whether the one or more mutated inputs provide new coverage; and upon determining that the one or more mutated inputs provide new coverage, adding the one or more mutated inputs to the input corpus.

16 Claims, 3 Drawing Sheets

(56) References Cited

U.S. PATENT DOCUMENTS

2018/0285186 A1* 10/2018 Godefroid ............ G06F 11/0751
2019/0005386 A1*  1/2019 Chen .................... G06K 9/6262
2019/0340492 A1* 11/2019 Burger .................... G06N 3/08

OTHER PUBLICATIONS

Sun, Youcheng, Xiaowei Huang, and Daniel Kroening. "Testing deep neural networks." arXiv preprint arXiv:1803.04792v3 (2018). (Year: 2018).*

Sun, Zhun, Mete Ozay, and Takayuki Okatani. "HyperNetworks with statistical filtering for defending adversarial examples." arXiv preprint arXiv: 1711.01791 (2017). (Year: 2017).*

Collins Dictionary. "Definition of 'random'", https://www.collinsdictionary.com/US/dictionary/english/random. Jan. 26, 2018. Accessed on Wayback Machine Aug. 24, 2019. (Year: 2018).*

Schumacher, Tobias, et al. "A Hardware Accelerator for k-th Nearest Neighbor Thinning." ERSA. 2008. (Year: 2008).*

Tian, Yuchi, et al. "DeepTest: Automated Testing of Deep-Neural-Network-driven Autonomous Cars." arXiv preprint arXiv: 1708.08559v2 (2018). (Year: 2018).*

Angelova et al., "Real-Time Pedestrian Detection with Deep Network Cascades", British Machine Vision Conference, Sep. 7-10, 2015, Swansea, United Kingdom, 12 pages.

Bandanau et al., "Neural Machine Translation by Jointly Learning to Align and Translate", arXiv:1409.0473v4, Dec. 19, 2014, 15 pages.

Berk et al., "Fairness in Criminal Justice Risk Assessments: The State of the Art", arXiv:1703.09207v2, May 28, 2017, 42 pages.

Böhme et al., "Coverage-Based Greybox Fuzzing as Markov Chain", Transactions on Software Engineering, Dec. 2017, 18 pages.

Böhme et al., "Directed Greybox Fuzzing", Conference on Computer and Communications Security, Oct. 30-Nov. 3, 2017, Dallas, Texas, pp. 2329-2344.

Bojarski et al., "End to End Learning for Self-Driving Cars", arXiv:1604.07316v1, Apr. 25, 2016, 9 pages.

Chen et al., "Metamorphic Testing: A New Approach for Generating Next Test Cases", Technical Report, Department of Computer Science, Hong Kong University of Science and Technology, 1998, 11 pages.

Goldberg, "What Every Computer Scientist Should Know about Floating-Point Arithmetic", AMC Computing Surveys, vol. 23, No. 1, Mar. 1991, pp. 5-48.

Google Testing Blog "Announcing OSS-Fuzz: Continuous Fuzzing for Open Source Software", Dec. 1, 2016, https://opensource.googleblog.com/2016/12/announcing-oss-fuzz-continuous-fuzzing, retrieved on May 30, 2019.

Graves et al., "Neural Turing Machines", arXiv:1410.5401v2, Dec. 10, 2014, 26 pages.

Gulshan et al., "Development and Validation of a Deep Learning Algorithm for Detection of Diabetic Retinopathy in Retinal Fundus Photographs", JAMA Network, vol. 316, No. 22, Dec. 13, 2016, pp. 2402-2410.

Hayhurst et al., "A Practical Tutorial on Modified Condition/Decision Coverage", National Aeronautics and Space Administration, May 2001, 85 pages.

He et al., "Deep Residual Learning for Image Recognition", Conference on Computer Vision and Pattern Recognition, Jun. 26-Jul. 1, 2016, Las Vegas, Nevada, pp. 770-778.

Hochreiter et al., "Long Short-Term Memory", Neural Computation, vol. 9, No. 8, 1997, 32 pages.

Hubara et al., "Quantized Neural Networks: Training Neural Networks with Low Precision Weights and Activations", arXiv:1609.07061v1, Sep. 22, 2016, 29 pages.

Huval et al., "An Empirical Evaluation of Deep Learning on Highway Driving", arXiv:1504.01716v3, Apr. 17, 2017, 7 pages.

Jouppi et al., "In-Datacenter Performance Analysis of a Tensor Processing Unit", International Symposium on Computer Architecture, Jun. 24-28, 2017, Toronto, Canada, 12 pages.

Karpathy Blog, "The Unreasonable Effectiveness of Recurrent Neural Networks", May 21, 2015, http://karpathy.github.io/2015/05/21/rnn-effectiveness, retrieved on May 30, 2019, 28 pages.

Karpathy et al., "Visualizing and Understanding Recurrent Networks", arXiv:1506.02078v2, Nov. 17, 2015, 12 pages.

Katz et al., "Reluplex: An efficient SMT Solver for Verifying Deep Neural Networks", Conference on Computer Aided Verification, Jul. 22-28, 2017, Heidelberg, Germany, pp. 97-117.

Kirsch et al., "Distance-Sensitive Bloom Filters", Workshop on Algorithm Engineering and Experiments, Jan. 21, 2006, Miami, Florida, pp. 41-50.

LeCun et al., "Gradient-Based Learning Applied to Document Recognition", Institute of Electrical and Electronic Engineers, vol. 86, Issue 11, Nov. 1998, 46 pages.

Lipton, "The Mythos of Model Interpretability", arXiv:1606.03490v2, Jun. 16, 2016, 5 pages.

LLVM Compiler Infrastructure, "Libfuzzer: A Library for Coverage-Guided Fuzz Testing", https://llvm.org/docs/LibFuzzer.html, retrieved on May 30, 2019, 13 pages.

Ma et al., "Deepgauge: Comprehensive and Multi-Granularity Testing Criteria for Gauging the Robustness of Deep Learning Systems", arXiv:1803.07519v4, Aug. 14, 2018, 12 pages.

Muja et al., "Scalable Nearest Neighbor Algorithms for High Dimensional Data", Transactions on Pattern Analysis and Machine Intelligence, vol. 36, No. 11, Nov. 2014, pp. 2227-2240.

Open AI, "Nonlinear Computation in Deep Linear Networks", Sep. 29, 2017, https://openai.com/blog/nonlinear-computation-in-linear-networks/, retrieved on May 30, 2019, 4 pages.

Pei et al., "DeepXplore: Automated Whitebox Testing of Deep Learning Systems", arXiv:1705.06640v4, Sep. 24, 2017, 18 pages.

Rae et al., "Scaling Memory-Augmented Neural Networks with Sparse Reads and Writes", arXiv:1610.09027v1, Oct. 27, 2016, 17 pages.

Scarborough et al., "Neural Networks in Organizational Research: Applying Pattern Recognition to the Analysis of Organizational Behavior", Washington, D.C., 2006, American Psychological Association, Washington, D.C., Mar. 8, 2007, 175 pages.

Sen et al., "CUTE: A Concolic Unit Testing Engine for C", European Software Engineering Conference and Symposium on the Foundations of Software Engineering, Sep. 5-9, 2005, Lisbon, Portugal, 10 pages.

Siano et al., "Real Time Operation of Smart Grids via FCN Networks and Optimal Power Flow", Transactions on Industrial Informatics, vol. 8, No. 4, Nov. 2012, 944-952.

Sun et al., "Concolic Testing for Deep Neural Networks", arXiv:1805.00089v2, Aug. 4, 2018, 26 pages.

Sun et al., "Testing Deep Neural Networks", arXiv:1803.04792v3, Mar. 18, 2018, 25 pages.

Szegedy et al., "Intriguing Properties of Neural Networks", arXiv:1312.6199v1, Dec. 21, 2013, 10 pages.

Tian et al., "Automated Testing of Deep-Neural Network-Driven Autonomous Cars", arXiv:1708.08559v1, Aug. 28, 2017, 12 pages.

Wicker et al., "Feature-Guided Black-Box Safety Testing of Deep Neural Networks", Oct. 21, 2017, arXiv:1710.07859v1, 24 pages.

Zalewski, "American Fuzzy Lop", www.lcamtuf.coredump.cx, retrieved on Jun. 17, 2019, 6 pages.

Guo et al., "DLFuzz: Differential Fuzzing Testing of Deep Learning Systems", arxiv.org, Cornell University Library, Ithaca, New York, Aug. 28, 2018, XP081267018, 6 pages.

International Search Report and Written Opinion for PCT/US2019/032913, dated Sep. 4, 2019, 11 pages.

Odena et al., "TensorFuzz: Debugging Neural Networks with Coverage-Guided Fuzzing", arxiv.org, Cornell University Library, Ithaca, New York, Jul. 28, 2018, XP081251939, 12 pages.

Xie et al., "DeepHunter: Hunting Deep Neural Network Defects via Coverage-Guided Fuzzing", Nov. 16, 2018, https://arxiv.org/pdf/1809.01266.pdf, retrieved on Aug. 23, 2019, 26 pages.

* cited by examiner

SYSTEMS AND METHODS FOR DEBUGGING NEURAL NETWORKS WITH COVERAGE GUIDED FUZZING

The present application is based on and claims the benefit of U.S. Provisional Application No. 62/673,751 having a filing date of May 18, 2018, which is incorporated by reference herein in its entirety for all purposes.

FIELD

The present disclosure relates generally to machine learned models. More particularly, the present disclosure relates to finding undesirable behavior in neural networks.

BACKGROUND

The use of machine learning models, such as neural networks, is becoming more important in solving a variety of tasks that have traditionally been difficult for a computing system. However, machine learning models are generally difficult to interpret and debug. As machine learning models like neural networks become more prevalent, it becomes more desirable to test neural networks to discover bugs and/or other undesirable behavior before a neural network is implemented in the "real world."

SUMMARY

Aspects and advantages of embodiments of the present disclosure will be set forth in part in the following description, or can be learned from the description, or can be learned through practice of the embodiments.

One example aspect of the present disclosure is directed to debugging a neural network. The method can include obtaining, by one or more computing devices, one or more inputs from an input corpus. The method can further include mutating, by the one or more computing devices, the one or more inputs. The method can further include providing, by the one or more computing devices, the one or more mutated inputs to a neural network. The method can further include obtaining, by the one or more computing devices as a result of the neural network processing the one or more mutated inputs, a set of coverage arrays that describe whether one or more neurons of the neural network were activated during processing of the one or more mutated inputs by the neural network. The method can further include determining, by the one or more computing devices based at least in part on the set of coverage arrays, whether the one or more mutated inputs provide new coverage. The method can further include upon determining that the one or more mutated inputs provide new coverage, adding, by the one or more computing devices, the one or more mutated inputs to the input corpus.

In some implementations, the method can further include obtaining, by the one or more computing devices as a result of the neural network processing the one or more mutated inputs, a set of metadata arrays that describe metadata associated with execution of the neural network to process the one or more mutated inputs; determining, by the one or more computing devices based at least in part on the set of metadata arrays, whether an objective function is satisfied; and upon determining that the objective function is satisfied, adding, by the one or more computing devices, the one or more mutated inputs to a list of test cases.

Another example aspect of the present disclosure is directed to a computing device. The computing device can include one or more processors and one or more non-transitory computer-readable media that store instructions that, when executed by the one or more processors, cause the computing device to perform operations. The instructions, when executed, can cause the computing device to obtain one or more inputs from an input corpus. The instructions, when executed, can further cause the computing device to mutate the one or more inputs. The instructions, when executed, can further cause the computing device to provide the one or more mutated inputs to a neural network. The instructions, when executed, can further cause the computing device to obtain as a result of the neural network processing the one or more mutated inputs, a set of coverage arrays that describe whether one or more neurons of the neural network were activated during processing of the one or more mutated inputs by the neural network The instructions, when executed, can further cause the computing device to determine based at least in part on the set of coverage arrays, whether the one or more mutated inputs provide new coverage. The instructions, when executed, can further cause the computing device to, upon determining that the one or more mutated inputs provide new coverage, add the one or more mutated inputs to the input corpus.

In some implementations, the computing device can further include instructions, that when executed, cause the computing device to obtain as a result of the neural network processing the one or more mutated inputs, a set of metadata arrays that describe metadata associated with execution of the neural network to process the one or more mutated inputs; determine based at least in part on the set of metadata arrays, whether an objective function is satisfied; and upon determining that the objective function is satisfied, add the one or more mutated inputs to a list of test cases.

Another example aspect of the present disclosure is directed to one or more non-transitory computer-readable media that store instructions that, when executed by one or more processors of a computing system, cause the computing system to perform operations. The operations include obtaining one or more inputs from an input corpus. The operations further include mutating the one or more inputs. The operations further include providing the one or more mutated inputs to a neural network. The operations further include obtaining, as a result of the neural network processing the one or more mutated inputs, a set of metadata arrays that describe metadata associated with execution of the neural network to process the one or more mutated inputs. The operations further include determining, based at least in part on the set of metadata arrays, whether an objective function is satisfied. The operations further include upon determining that the objective function is satisfied, add the one or more mutated inputs to a list of test cases.

In some implementations, the one or more non-transitory computer-readable media can store instructions that, when executed by one or more processors of a computing system, cause the computing system to obtain, as a result of the neural network processing the one or more mutated inputs, a set of coverage arrays that describe whether one or more neurons of the neural network were activated during processing of the one or more mutated inputs by the neural network; determine, based at least in part on the set of coverage arrays, whether the one or more mutated inputs provide new coverage; and upon determining that the one or more mutated inputs provide new coverage, add the one or more mutated inputs to the input corpus

BRIEF DESCRIPTION OF THE DRAWINGS

Detailed discussion of embodiments directed to one of ordinary skill in the art is set forth in the specification, which makes reference to the appended figures, in which.

Figure 1:
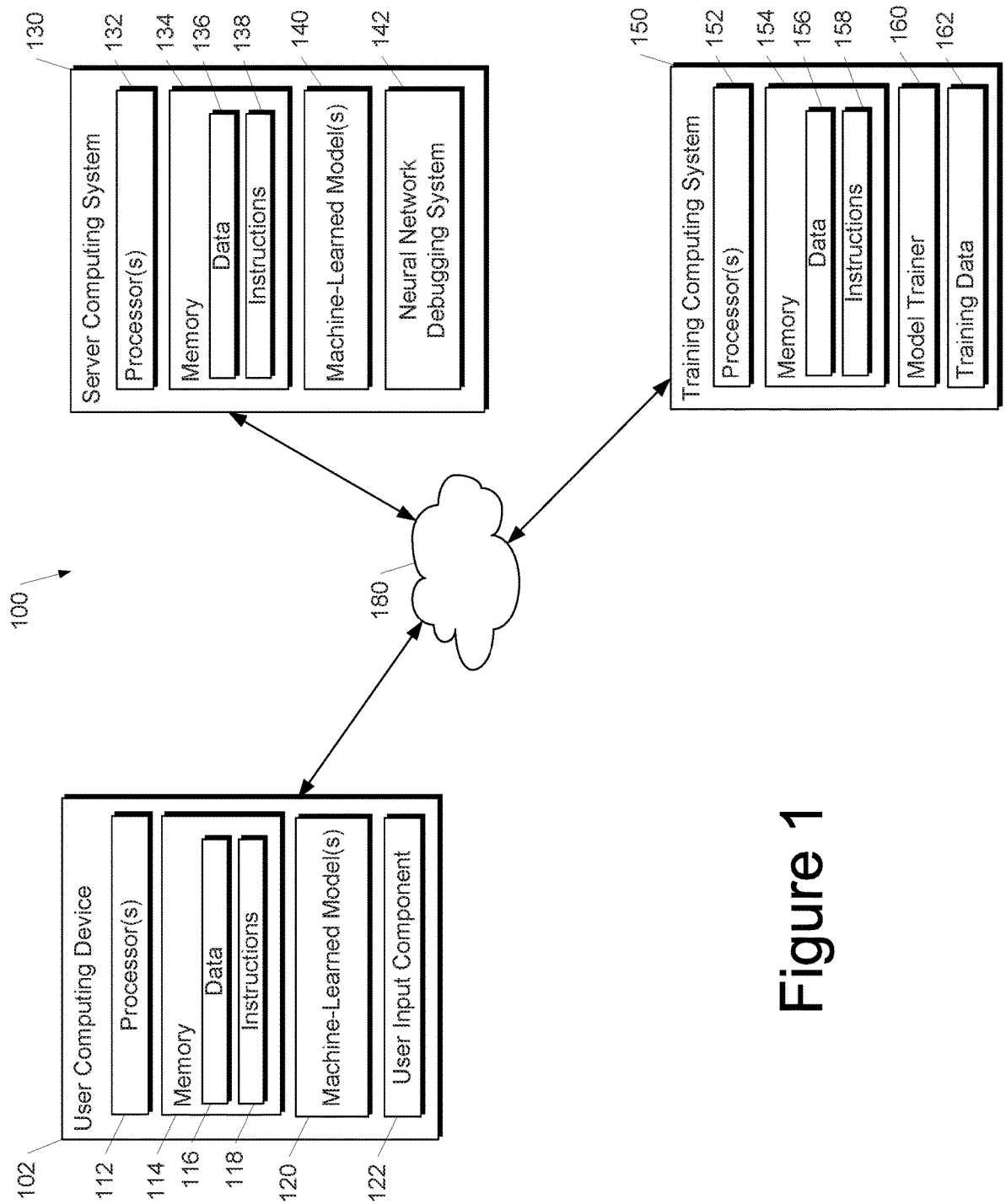
FIG. 1 depicts a block diagram of an example computing system that can be used with machine learning models according to example embodiments of the present disclosure.

Reference numerals that are repeated across plural figures are intended to identify the same features in various implementations.

DETAILED DESCRIPTION

Overview

Generally, the present disclosure is directed to machine-learned models, such as neural networks. In particular, the systems and methods of the present disclosure can provide for testing neural networks to find bugs and/or other undesirable behavior, for example, before a neural network is deployed. According to an aspect of the present disclosure, coverage guided fuzzing can be applied to neural networks to allow for debugging of the neural networks. For example, in some implementations, coverage guided fuzzing can be applied to neural networks to provide for finding numerical errors in trained neural networks, generating disagreements between neural networks and quantized versions of those networks, surfacing undesirable behavior in models (e.g., character level language models, etc.), and/or the like.

Machine learning models can be difficult to debug or interpret for a variety of reasons, ranging from the conceptual difficulty of specifying what the user wishes to know about the model in formal terms to statistical and computational difficulties in obtaining answers to formally specified questions. Neural networks can be particularly difficult to debug because even relatively straightforward formal questions about them can be computationally expensive to answer and because software implementations of neural networks can deviate significantly from theoretical models.

In general, coverage guided fuzzing provides for maintaining an input corpus comprising inputs to a program under consideration. Random changes are made to those inputs according to some mutation procedure, and the mutated inputs are added to an input corpus when they exercise new coverage (e.g., causing code to execute in a different way than previously seen, etc.).

The systems and methods of the present disclosure provide for inputting random mutations of inputs to a neural network where the mutations are guided by a coverage metric toward the goal of satisfying user-specified constraints. According to an aspect of the present disclosure, coverage can be measured by analyzing the activation vectors of the neural network coverage graph. For example, in some implementations, new coverage can be determined based on whether the neural network has resulted in a state that the neural network has not reached previously, such that the new coverage helps to provide incremental progress in debugging.

As one example, fast approximate nearest neighbor algorithms can be used to determine if two sets of neural network 'activations' are meaningfully different from each other. This provides a coverage metric producing useful results for neural networks, even when the underlying implementation of the neural network does not make use of many data-dependent branches. For example, in some implementations, the activations (or some subset of them) associated with each input can be stored and checked to determine whether coverage has increased on a given input by using an approximate nearest neighbors algorithm to see whether there are any other sets of activations within a pre-specified distance.

According to an aspect of the present disclosure, in some implementations, coverage guided fuzzing of a neural network can start with a seed corpus containing at least one set of inputs for the computation graph. The inputs can be restricted to those inputs that are in some sense valid neural network inputs. For example, if the inputs are images, the inputs can be restricted to those inputs that have the correct size and shape, and that lie in the same interval as the input pixels of the dataset under consideration. As another example, if the inputs are sequences of characters, inputs can be restricted to characters that are in the vocabulary extracted from the training set.

Given this seed corpus, until instructed to stop or some other stopping criterion in met, the neural network debugging system can choose elements from the input corpus according to some heuristic (e.g., uniform random selection, some defined probability heuristic, etc.). Given this input, the neural network debugging system can perform some sort of modification to that input. For example, the modification can be as simple as just flipping the sign of an input pixel in an image. Additionally or alternatively, it can also be restricted to follow some kind of constraint on the total modification made to a corpus element over time. The mutated inputs can then be fed to the neural network. In some implementations, two things can be extracted from the neural network: a set of coverage arrays, from which the actual coverage can be computed, and a set of metadata arrays, from which the result of the objective function can be computed. For example, the coverage arrays can describe which neurons of the neural network were activated during processing of the input, and therefore may be referred to as or used to generate an "activation vector." As another example, the metadata array can describe a behavior, output, result, prediction, outcome, timings, statistics, run times, memory consumption, processor usage, and/or other metadata associated with execution of the neural network to process the input. Once the coverage and/or objective is computed, the mutated input can be added to the corpus if it exercises new coverage, and/or it can be added to a list of test cases if it causes the objective function the be satisfied.

For example, an objective function can be used to assess whether some particular state (e.g., an erroneous state, etc.) has been reached. The objective function can be applied to the metadata arrays and inputs that caused the objective to be satisfied can be flagged. The neural network debugging system can determine whether the coverage provided by the mutated input is new coverage (e.g., whether the neural network has reached a state that it has not reached previously, etc.) based on the coverage arrays. For example, in some implementations, when a new activation vector is received, its nearest neighbor can be determined (e.g., through performance of an approximate nearest neighbors algorithm) and checked for how far away the nearest neighbor is (e.g., in Euclidean distance). The input can be added to the corpus if the distance is greater than some defined amount. Performing the nearest neighbor algorithm can include applying a distance-sensitive Bloom filter.

In some implementations, the input mutations can be performed as a batch and the batch of inputs can be fed to the computation graph. The coverage and objective function can then be checked on a batch of output arrays.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example Devices and Systems

FIG. 1 depicts a block diagram of an example computing system 100 that provides for the use of machine learning according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a cloud based service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

Figure 2:
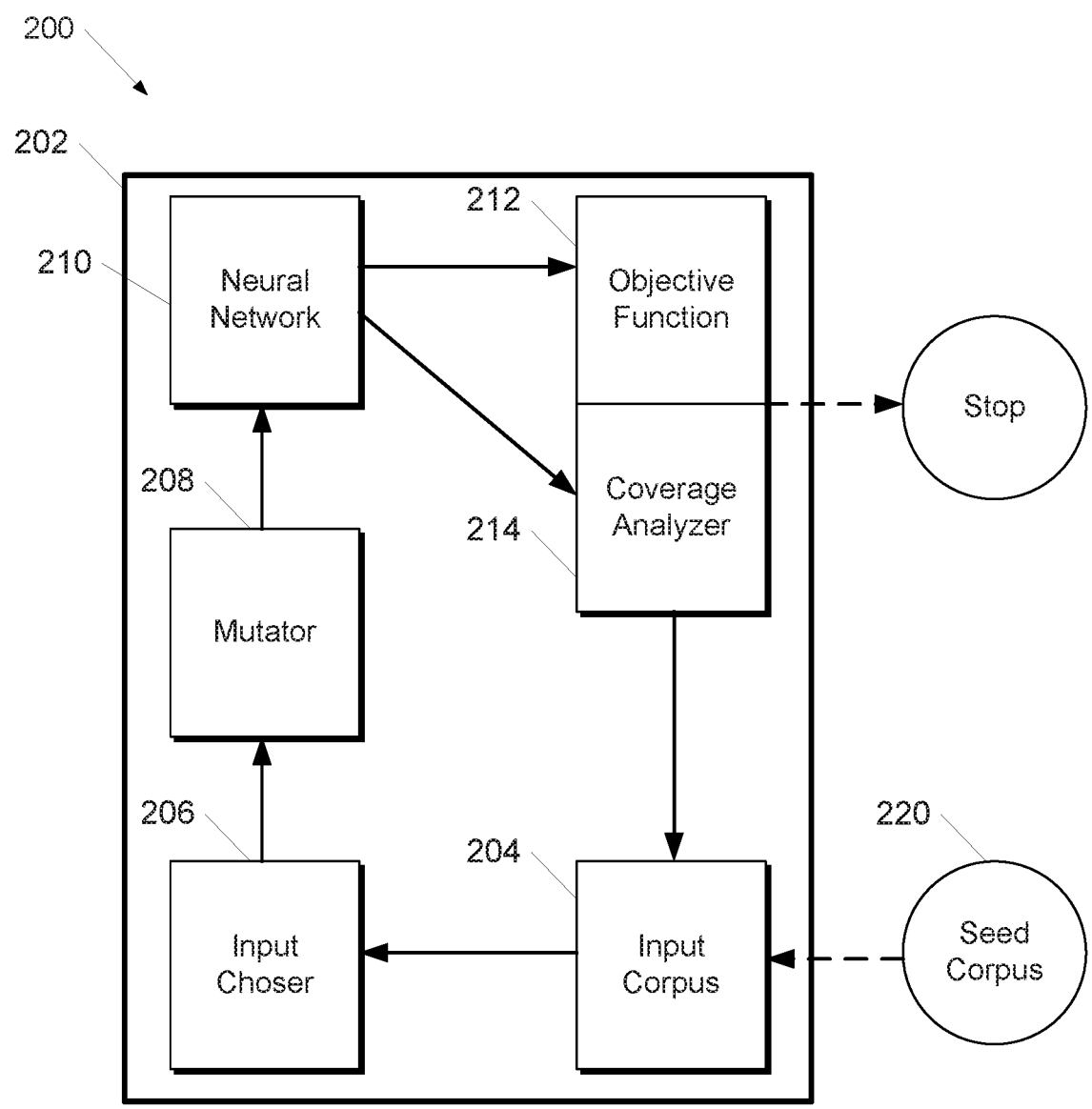
FIG. 2 depicts a block diagram of an example coverage guided fuzzing system according to example embodiments of the present disclosure.

In some implementations, the server computing system 130 can further include a neural network debugging system 142, such as described herein with regard to FIG. 2. For example, the neural network debugging system 142 can provide for performing coverage guided fuzzing using a corpus of inputs, for instance, to provide for testing neural networks, such as to discover errors which may occur for rare inputs.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train the machine-learned models 120 and/or 140 based on a set of training data 162.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Example Debugging System Arrangement

FIG. 2 depicts a block diagram of an example neural network debugging system 200 using coverage guided fuzzing according to example embodiments of the present disclosure. In some implementations, the neural network debugging system 200 can provide for performing coverage guided fuzzing using a corpus of inputs, for example, to provide for testing neural networks, such as to discover errors which may occur for rare inputs. The neural network debugging system 200 can allow for guiding mutations to corpus inputs by a coverage metric to work toward a goal of satisfying user-specified constraints (e.g., random changes are made to inputs according to some mutation procedure and the mutated inputs are added to an input corpus when they exercise new coverage). As an example, coverage can be measured by analyzing the activation vectors of the neural network coverage graph. For instance, in some implementations, new coverage can be determined based on whether the neural network has resulted in a state that the neural network has not reached previously, such that the new coverage helps to provide incremental progress in debugging of the neural network model. For example, in some implementations, coverage guided fuzzing can be applied to neural networks to provide for finding numerical errors in trained neural networks, generating disagreements between neural networks and quantized versions of those networks, surfacing undesirable behavior in models, and/or the like.

As illustrated in FIG. 2, a neural network debugging system 200 can include a coverage guided fuzzer 202 and a seed corpus 220 (e.g., containing at least one set of inputs for the computation graph) which can provide for an initial set of inputs to a coverage guided fuzzer 202 to test a neural network.

The coverage guided fuzzer 202 can obtain (e.g., select) a set of inputs from the seed corpus 220 to provide an input corpus 204, which may comprise all or some subset of inputs included in the seed corpus 220. In some implementations, the inputs can be restricted to some type of valid neural network inputs (e.g., images having a correct size and shape, characters that are in a vocabulary extracted from a training set, etc.). In some implementations, the seed corpus 220 can be supplied by a user and/or can be selected from a set of available seed corpuses. The inputs can be textual inputs, image inputs, audio data inputs, sensor data inputs, and/or various other types of inputs.

The coverage guided fuzzer 202 can include an input chooser 206 that can select input(s) from the input corpus 204 to use during a particular iteration of the coverage guided fuzzing. For example, in some implementations, the input chooser 206 can select inputs using uniform random selection. For example, in some implementations, the input chooser 206 can be biased towards selecting inputs that were more recently added to the input corpus 204. As one example, the input chooser 206 can select inputs using a heuristic such as $$p(c_k, t) = \frac{e^{t_k - t}}{\sum e^{t_k - t}},$$

wherein $p(c_k, t)$ gives a probability of choosing an input corpus element $c_k$ at time t where $t_k$ is the time when element $c_k$ was added to the input corpus. The intuition behind this is that recently sampled inputs are more likely to yield useful new coverage when mutated, but that this advantage decays as time progresses, and thus inputs can be selected as a function of their age.

The input chooser 206 can provide the selected input(s) to a mutator 208. The mutator 208 can apply modifications (e.g., mutations) to the selected input(s) before the inputs are provided to the neural network. For example, in some implementations, the mutator 208 can add white noise of a user-configurable variance to input(s) (e.g., image inputs, etc.). As another example, in some implementations, the mutator 208 can add white noise of a user-configurable variance to the one or more inputs (e.g., image inputs, etc.), wherein a difference between the mutated input and an original input from which the mutated input is descended is constrained to have a user-configurable $L_\infty$ norm. This type of constrained mutation can be useful to find inputs that satisfy some objective function, but are still plausibly of the same "class" as the original input that was used as a seed. In some implementations, the image can be clipped after mutation so that it lies in the same range as the inputs used to train the neural network being debugged.

As another example, in some implementations, such as with text string inputs, one of a set of operations can be uniformly performed at random, including operations such as deleting a character at a random location, adding a character at a random location, substituting a random character at a random location, and/or the like.

The input chooser 206 includes computer logic utilized to provide desired functionality. The input chooser 206 can be implemented in hardware, firmware, and/or software controlling a general purpose processor. For example, in some implementations, the input chooser 206 includes program files stored on a storage device, loaded into a memory and executed by one or more processors. In other implementations, the input chooser 206 includes one or more sets of computer-executable instructions that are stored in a tangible computer-readable storage medium such as RAM hard disk or optical or magnetic media.

The mutator 208 can then provide the mutated input(s) to the neural network 210. The neural network 210 can provide outputs which can include a set of coverage arrays, for which coverage can be computed, and a set of metadata arrays, from which a result of an objective function can be computed. For example, when the mutated inputs are fed into a computation graph, both coverage arrays and metadata arrays are returned as output.

The mutator 208 includes computer logic utilized to provide desired functionality. The mutator 208 can be implemented in hardware, firmware, and/or software controlling a general purpose processor. For example, in some implementations, the mutator 208 includes program files stored on a storage device, loaded into a memory and executed by one or more processors. In other implementations, the mutator 208 includes one or more sets of computer-executable instructions that are stored in a tangible computer-readable storage medium such as RAM hard disk or optical or magnetic media.

The objective function 212 can assess whether the neural network has reached some particular state, for example, a state which may be regarded as erroneous, based on the metadata array(s). An erroneous state may include an incorrect prediction, an execution time greater than a maximum execution time, a processor usage greater than a maximum processor usage, a failure of the neural network to execute, and/or other the existence of other errors or undesirable behavior or performance. In some implementations, the objective function 212 can be specified by a user and/or selected from a set of available objective functions. Generally, the objective function 212 used to assess whether the neural network has reached some particular state can be separate and distinct from some other objective or loss function used to train the neural network. If the objective function 212 is satisfied, the mutated input(s) provided to the neural network can be flagged, such as being added to a list of test cases (e.g., for future debugging, etc.). As an example, when the mutated inputs are fed into a computation graph and metadata arrays are returned as output, the objective function can be applied to the metadata arrays and any mutated inputs that caused the objective function to be satisfied can be flagged.

The coverage analyzer 214 can determine whether the coverage provided by the mutated input(s) is new coverage (e.g., whether the neural network has reached a state that it has not reached previously, etc.) based on the coverage array(s). For example, in some implementations, coverage analyzer 214 can determine whether new coverage is provided based on whether an activation vector is approximately close to a previous activation vector. If the coverage analyzer 214 determines that the mutated input(s) provide new coverage, the mutated input(s) can be added to the input corpus 204, for example, to be used as input(s) in future iterations of debugging and/or the like. For example, an approximate nearest neighbor can be computed for a new activation vector and checked to determine how far away the nearest neighbor is in Euclidean distance from the activation vector. The input can be added to the corpus if the distance is greater than some defined amount (e.g., which can be a user-configurable hyperparameter, an adaptive hyperparameter to adapts over time, and/or a dynamic hyperparameter that changes over time, for example, according to a predetermined schedule). In some implementations, the coverage guided fuzzer 202 can continue to select, mutate, and analyze inputs included in the input corpus 204 until instructed to stop and/or some other stopping criterion in met.

The coverage analyzer 214 includes computer logic utilized to provide desired functionality. The coverage analyzer 214 can be implemented in hardware, firmware, and/or software controlling a general purpose processor. For example, in some implementations, the coverage analyzer 214 includes program files stored on a storage device, loaded into a memory and executed by one or more processors. In other implementations, the coverage analyzer 214 includes one or more sets of computer-executable instructions that are stored in a tangible computer-readable storage medium such as RAM hard disk or optical or magnetic media.

The coverage arrays and/or associated activation vectors may describe whether some or all of the neurons of the neural network were activated during processing of an input. As one example, a coverage array and/or associated activation vector may be limited to describing only whether the logits of the neural network and/or neurons of a layer of the network prior to the logits were activated.

In some implementations, the system 200 can be applied (e.g., in parallel) to two or more different (but potentially related) models to identify disagreements between the models. For example, the two or more different models can be two or more different versions of a base model such as a base model and a quantized version of the base model. To identify disagreements, the same input (e.g., a mutated input) can be provided to the two or more different models and the two or more different outputs of the two or more different models can be analyzed (e.g., according to the objective function 212 and/or the coverage analyzer 214) to detect disagreements or otherwise measure a divergence in the outputs.

Example Methods

Figure 3:
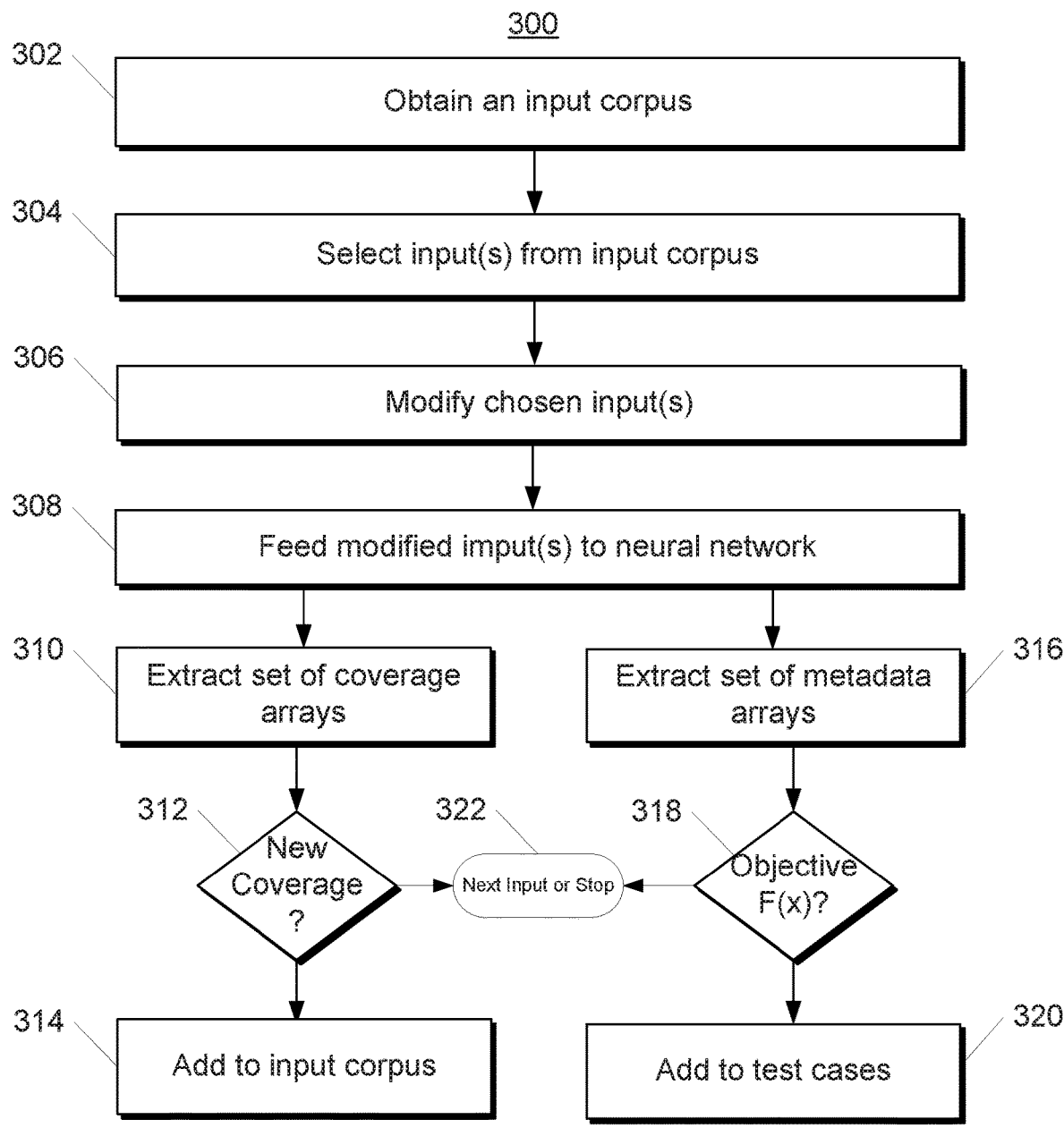
FIG. 3 depicts a flow chart diagram of example operations to perform neural network debugging according to example embodiments of the present disclosure.

FIG. 3 depicts a flow chart diagram of example operations to perform neural network debugging according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain an input corpus, for example from a seed corpus comprising one or more sets of inputs. For example, a seed corpus can contain at least one set of inputs for the computation graph. The inputs can be restricted to those inputs that are in some sense valid neural network inputs. For example, if the inputs are images, the inputs can be restricted to those inputs that have the correct size and shape, and that lie in the same interval as the input pixels of the dataset under consideration. As another example, if the inputs are sequences of characters, inputs can be restricted to characters that are in the vocabulary extracted from the training set.

At 304, the computing system can select one or more inputs from the input corpus for use in debugging a neural network. For example, the computing system can select one or more inputs from the input corpus based on uniform random selection, based on one or more heuristics (e.g., $$p(c_k, t) = \frac{e^{t_k - t}}{\sum e^{t_k - t}}$$

giving a probability of choosing an input corpus element $c_k$ at time t where $t_k$ is the time when element $c_k$ was added to the input corpus, etc.), and/or the like.

At 306, the computing system can modify the selected input(s) prior to input to the neural network by performing some type of mutation on the selected input(s). For example, in some implementations, the computing system can perform a simple modification of the input such as flipping a sign of an input. As another example, in some implementations, computing system can restrict the modifications to follow a constraint on the total modification made to a corpus element over time.

At 308, the computing system feed the modified input(s) to the neural network that is to be debugged.

At 310, the computing system can obtain, as a result of the neural network processing the one or more mutated inputs, a set of coverage arrays (e.g., that describe whether one or more neurons of the neural network were activated during processing of the one or more mutated inputs by the neural network) which can be used to compute the actual coverage exercised by the modified input(s).

At 312, the computing system the computing system can determine whether the mutated input(s) provide new coverage at least in part on the coverage array(s). For example, the computing system can determine that new coverage is provided is the neural network results in a state that it has not been in before. If the mutated input(s) provide new coverage, operation continues to 314. If the mutated input(s) do not provide new coverage, operations continue to 322, where a next input can be analyzed. For example, in some implementations, when a new activation vector is received, its nearest neighbor can be determined and checked for how far away the nearest neighbor is in Euclidean distance. The input can be added to the corpus if the distance is greater than some defined amount.

At 314, the computing system can add the mutated input(s) to the input corpus.

At 316, the computing system, as a result of the neural network processing the one or more mutated inputs, a set of metadata arrays (e.g., that describe metadata associated with execution of the neural network to process the one or more mutated inputs) for use in computing the objective function.

At 318, the computing system can determine whether the objective function is satisfied based at least in part on the metadata array(s). For example, the objective function can assess whether the neural network has reached a particular state, such as state that is regarded as erroneous. For example, the objective function can be applied to the metadata arrays and inputs that cause the objective to be satisfied can be flagged. If the objective function is satisfied, operation continues to 320. If the objective function is not satisfied, operation continues to 322.

At 320, the computing system can add the mutated input to a list of test cases.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for debugging a neural network, the method comprising:
    obtaining, by one or more computing devices, one or more inputs from an input corpus;
    mutating, by the one or more computing devices, the one or more inputs;
    providing, by the one or more computing devices, the one or more mutated inputs to a neural network;
    executing, by the one or more computing devices, the neural network to process the one or more mutated inputs as input and producing one or more outputs;
    obtaining, by the one or more computing devices, as a result of the neural network processing the one or more mutated inputs, an activation vector that describes, for each of a plurality of neurons of the neural network, whether the neuron was activated during processing of the one or more mutated inputs by the neural network, wherein the plurality of neurons of the neural network comprises at least one neuron in a layer prior to a final layer of the neural network;
    obtaining, by the one or more computing devices, a predetermined threshold distance;

performing, by the one or more computing devices, a nearest neighbors algorithm to determine whether a Euclidean distance between the activation vector and a nearest previous activation vector associated with a previous input to the neural network satisfies the predetermined threshold distance;

upon determining that the Euclidean distance between the activation vector and the nearest previous activation vector satisfies the predetermined threshold distance, determining, by the one or more computing devices, that the one or more mutated inputs provide new coverage; and upon determining that the one or more mutated inputs provide new coverage, adding, by the one or more computing devices, the one or more mutated inputs to the input corpus.

2. The method of claim 1, wherein obtaining one or more inputs from the input corpus comprises using uniform random selection to select the one or more inputs from the input corpus.

3. The method of claim 1, wherein mutating the one or more inputs comprises adding white noise of a user-configurable variance to the one or more inputs.

4. The method of claim 1, wherein mutating the one or more inputs comprises adding white noise of a user-configurable variance to the one or more inputs, wherein a difference between the mutated input and an original input from which the mutated input is descended is constrained to have a user-configurable $L_\infty$ norm.

5. The method of claim 1, further comprising determining whether an objective function is satisfied, wherein determining whether the objective function is satisfied comprises determining whether the neural network has reached a particular state.

6. The method of claim 5, wherein the particular state is an erroneous state for the neural network.

7. The computer-implemented method of claim 1, the method further comprising:
providing, by the one or more computing devices, the one or more mutated inputs to a quantized version of the neural network;
executing, by the one or more computing devices, the quantized version of the neural network to process the one or more mutated inputs as input and producing one or more secondary outputs;
obtaining, by the one or more computing devices as a result of the quantized version of the neural network processing the one or more mutated inputs, a secondary activation vector that describes which neurons of the quantized version of the neural network were activated during processing of the one or more mutated inputs by the neural network; and
comparing, by the one or more computing devices, the secondary activation vector to the activation vector to determine one or more differences in coverage between the neural network and the quantized version of the neural network.

8. The method of claim 1, further comprising:
obtaining, by the one or more computing devices as a result of the neural network processing the one or more mutated inputs, a set of metadata arrays that describe metadata associated with execution of the neural network to process the one or more mutated inputs;
determining, by the one or more computing devices based at least in part on the set of metadata arrays, whether an objective function is satisfied; and upon determining that the objective function is satisfied, adding, by the one or more computing devices, the one or more mutated inputs to a list of test cases.

9. The method of claim 8, wherein:
the metadata arrays include at least one of a run time of the neural network or an amount of processor usage of the neural network; and
the objective function evaluates one or both of: whether the run time of the neural network is greater than a maximum execution time and whether the amount of process usage of the neural network is greater than a maximum processor usage.

10. The method of claim 1, wherein performing the nearest neighbors algorithm comprises applying a distance-sensitive Bloom filter.

11. The method of claim 1, further comprising:
after debugging the neural network, deploying the neural network to perform a task.

12. A computing device comprising:
one or more processors; and
one or more non-transitory computer-readable media that store instructions that, when executed by the one or more processors, cause the computing device to:
obtain one or more inputs from an input corpus;
mutate the one or more inputs;
provide the one or more mutated inputs to a neural network;
execute the neural network to process the one or more mutated inputs as input and producing one or more outputs;
obtain, as a result of the neural network processing the one or more mutated inputs, an activation vector that describes, for each of a plurality of neurons of the neural network, whether the neuron was activated during processing of the one or more mutated inputs by the neural network, wherein the plurality of neurons of the neural network comprises at least one neuron in a layer prior to a final layer of the neural network;
obtain a predetermined threshold distance;
perform a nearest neighbors algorithm to determine whether a Euclidean distance between the activation vector and a nearest previous activation vector associated with a previous input to the neural network satisfies the predetermined threshold distance;
upon determining that the Euclidean distance between the activation vector and the nearest previous activation vector satisfies the predetermined threshold distance, determine that the one or more mutated inputs provide new coverage; and
upon determining that the one or more mutated inputs provide new coverage, add the one or more mutated inputs to the input corpus.

13. The computing device of claim 12, further comprising instructions, that when executed, cause the computing device to:
obtain the input corpus from a seed corpus, the seed corpus containing at least one set of inputs.

14. The computing device of claim 12, wherein mutating the one or more inputs comprises:
adding white noise of a user-configurable variance to the one or more inputs;
adding white noise of a user-configurable variance to the one or more inputs, wherein a difference between the mutated input and an original input from which the mutated input is descended is constrained to have a user-configurable $L_{inf}$ norm; or performing one of a set of operations uniformly at random.

15. The computing device of claim 12, further comprising determining whether an objective function is satisfied by determining whether the neural network has reached a particular state, wherein the particular state is an erroneous state for the neural network.

16. One or more non-transitory computer-readable media that store instructions that, when executed by one or more processors of a computing system, cause the computing system to perform operations, the operations comprising:
obtaining one or more inputs from an input corpus;
mutating the one or more inputs;
providing the one or more mutated inputs to a neural network;
executing the neural network to process the one or more mutated inputs as input and producing one or more outputs;
obtaining as a result of the neural network processing the one or more mutated inputs, an activation vector that describes, for each of a plurality of neurons of the neural network, whether the neuron was activated during processing of the one or more mutated inputs by the neural network, wherein the plurality of neurons of the neural network comprises at least one neuron in a layer prior to a final layer of the neural network;
obtaining a predetermined threshold distance;
performing a nearest neighbors algorithm to determine whether a Euclidean distance between the activation vector and a nearest previous activation vector associated with a previous input to the neural network satisfies the predetermined threshold distance;
upon determining that the Euclidean distance between the activation vector and the nearest previous activation vector satisfies the predetermined threshold distance, determining that the one or more mutated inputs provide new coverage; and
upon determining that the one or more mutated inputs provide new coverage, adding the one or more mutated inputs to the input corpus.

* * * * *